US012307932B2

(12) United States Patent
Kondo

(10) Patent No.: US 12,307,932 B2
(45) Date of Patent: May 20, 2025

(54) DRIVER CIRCUIT AND IMAGE DISPLAY SYSTEM

(71) Applicant: LAPIS Technology Co., Ltd., Yokohama (JP)

(72) Inventor: Hironori Kondo, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/607,529

(22) Filed: Mar. 17, 2024

(65) Prior Publication Data

US 2024/0321158 A1 Sep. 26, 2024

(30) Foreign Application Priority Data

Mar. 24, 2023 (JP) ................................ 2023-047906
Jan. 22, 2024 (JP) ................................ 2024-007649

(51) Int. Cl.
*G09G 3/00* (2006.01)
*G09G 3/36* (2006.01)

(52) U.S. Cl.
CPC ............... *G09G 3/006* (2013.01); *G09G 3/36* (2013.01); *G09G 2300/0814* (2013.01); *G09G 2320/02* (2013.01); *G09G 2330/12* (2013.01); *G09G 2370/00* (2013.01)

(58) Field of Classification Search
CPC .. G09G 3/006; G09G 3/36; G09G 2300/0814; G09G 2320/02; G09G 2330/12; G09G 2370/00
See application file for complete search history.

(56) References Cited

U.S. PATENT DOCUMENTS

2018/0350285 A1* 12/2018 Goto .................. H01L 27/1255
2018/0350310 A1* 12/2018 Xiao ........................ G09G 3/36
2018/0350321 A1* 12/2018 Sun ...................... G06F 9/4411
2018/0352218 A1* 12/2018 Abe ......................... G09G 5/00
2019/0035315 A1* 1/2019 Ai ...................... G01R 31/3172
2019/0035333 A1* 1/2019 Chen .................... G09G 3/3241
2019/0042175 A1* 2/2019 Shah ...................... G08C 17/02
2019/0043457 A1* 2/2019 Hong ................. G06F 11/3476

FOREIGN PATENT DOCUMENTS

JP 2009145492 7/2009

* cited by examiner

*Primary Examiner* — Sejoon Ahn
(74) *Attorney, Agent, or Firm* — JCIPRNET

(57) ABSTRACT

A temporary storage section 21 is divided into a first area 31 that stores a part of setting data and a second area 32 that stores a part other than the setting data. The second area 32 stores transmitted setting data during a period in which setting data is being transmitted in a display command and copies and stores data stored in the first area 31 during a period in which RGB data is being transmitted in the display command. A comparison circuit 23 compares the data stored in the first area 31 with data stored in the second area 32 during a period in which the RGB data is being transmitted in the display command and outputs an abnormality detection signal 104 when they do not match.

7 Claims, 15 Drawing Sheets

DRIVER CIRCUIT AND IMAGE DISPLAY SYSTEM

CROSS-REFERENCE TO RELATED APPLICATION

This application claims the priority benefits of Japanese application no. 2023-047906, filed on Mar. 24, 2023, and Japanese application no. 2024-007649, filed on Jan. 22, 2024. The entirety of the above-mentioned patent applications is hereby incorporated by reference herein and made a part of this specification.

BACKGROUND

Technical Field

The present disclosure relates to a driver circuit (driver IC) for driving a liquid crystal display device such as an LCD (Liquid Crystal Display).

Description of Related Art

In recent years, a liquid crystal display device such as an LCD has been used as a display device in various information processing devices such as personal computers and mobile phone devices. In order to display data on such a liquid crystal display device, a driver circuit (driver IC) for driving the liquid crystal display device is used (see, for example, Patent Document 1 (Japanese Patent Laid-Open No. 2009-145492)).

In the driver IC for driving the above-described liquid crystal display device, in addition to the display data that is written for each line, setting data for performing various settings such as gamma curve settings necessary for image display and setting data necessary for maintaining a display system are written and held in internal registers.

However, when the setting data written in the internal register of the driver IC is changed or destroyed due to the occurrence of ESD (Electro Static Discharge) noise or the like, the displayed image may be affected and normal image display may be prevented.

Therefore, in order to prevent such image display abnormalities, a method is used in some cases in which an external device that transmits display data to the driver IC reads and checks the setting data stored in the driver IC and rewrites the setting data to the driver IC when the setting data has changed from the one that was supposed to be written.

However, when such a method is used, a system for reading and checking the setting data is required not only on the driver IC side but also on the external device side, which has the disadvantage of increasing the size of the system.

Further, a method may be used in which a flip-flop circuit for abnormality detection is installed in the driver IC and the values held in this flip-flop circuit for abnormality detection are monitored to ensure that the setting data is not destroyed due to ESD noise or the like. In such a method, when an abnormality is detected, the external device is notified of the occurrence of the abnormality, and the external device rewrites the setting data to the driver IC.

However, when using such a method, in order to increase the probability of detecting an abnormality, it is necessary to increase the number of flip-flop circuits for abnormality detection, which has the disadvantage of increasing the circuit scale of the driver IC.

Therefore, the disclosure provides a driver circuit and an image display system capable of detecting the possibility of an abnormality occurred in stored setting data without providing a register for detecting the abnormality when display data is displayed on a display panel on the basis of the setting data stored in the register.

SUMMARY

A driver circuit according to an embodiment is a driver circuit configured to receive a display command containing setting data and display data and display the display data on a display panel based on the setting data and including: a setting processing part that includes a temporary storage section temporarily storing the setting data contained in the display command until next setting data is transmitted and a reflection stage storage section storing the setting data stored in the temporary storage section; and an output circuit that displays the display data contained in the display command on the display panel based on the setting data stored in the reflection stage storage section, wherein the temporary storage section is divided into a first area storing a part of the setting data and a second area storing a part other than the setting data stored in the first area, wherein the second area stores the transmitted setting data during a period in which the setting data is being transmitted in the display command and copies and stores data stored in the first area during a period in which the display data is being transmitted in the display command, and wherein the setting processing part further includes a comparison circuit that compares the data stored in the first area with data stored in the second area during a period in which the display data is being transmitted in the display command and outputs an abnormality detection signal indicating a possibility of an abnormality in the stored setting data when the data do not match.

DESCRIPTION OF THE EMBODIMENTS

Next, embodiments of the present disclosure will be described in detail with reference to the drawings.

First Embodiment

Figure 1:
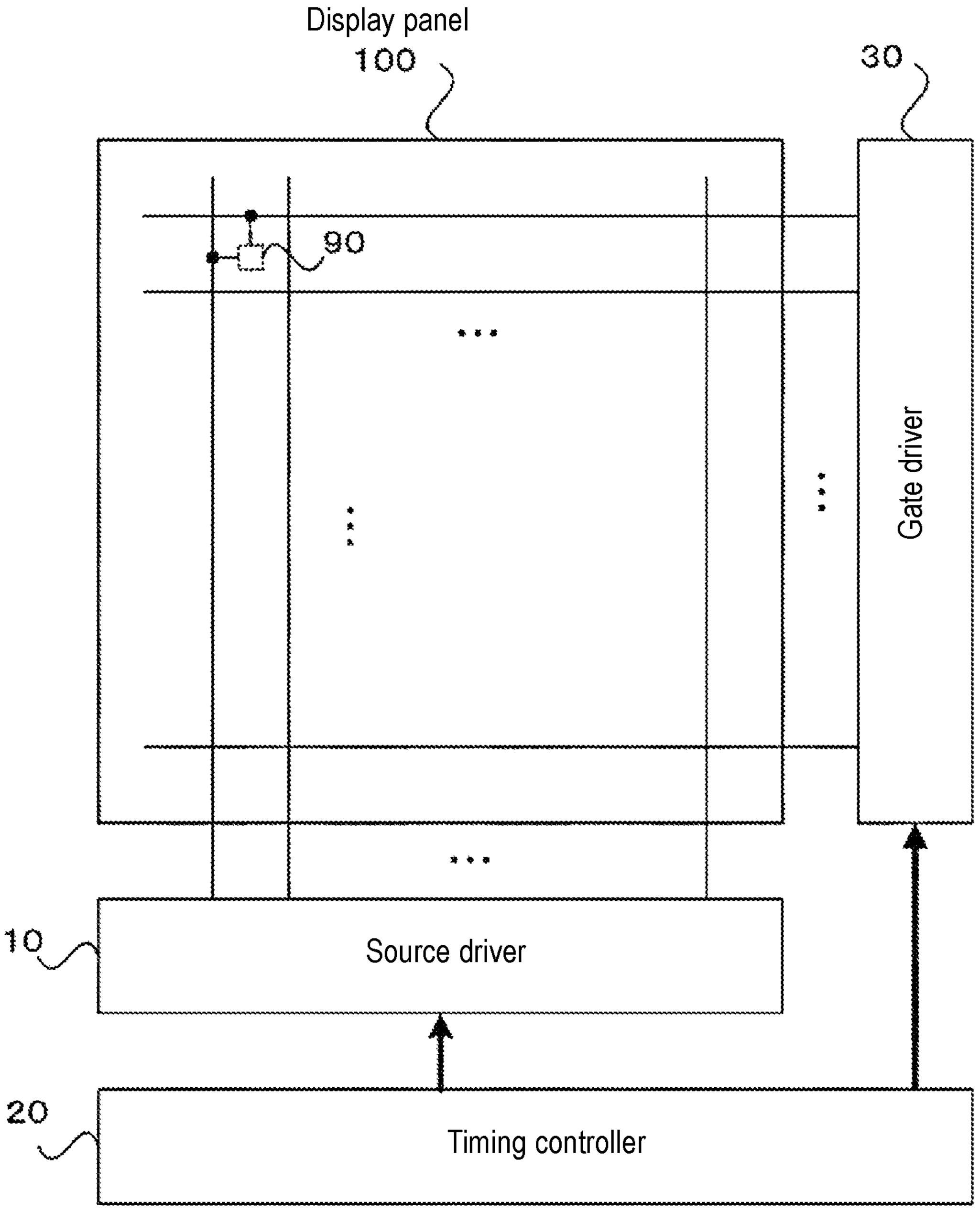
FIG. 1 is a block diagram illustrating an overall configuration of an image display system of a first embodiment of the present disclosure.

FIG. 1 is a block diagram schematically illustrating an overall configuration of an image display system of a first embodiment of the present disclosure.

The image display system of this embodiment is configured to display an image on a display panel 100 and includes a source driver 10, a gate driver 30, and a timing controller 20.

The display panel 100 is, for example, an active matrix liquid crystal display device in which display pixels 90 each including a pixel transistor such as a thin film transistor are arranged in a matrix. The display panel 100 includes a scanning line that connects each display pixel 90 in the row direction and a signal line that connects the display pixels 90 in the column direction. The gate driver 30 is configured to control the alignment state of liquid crystal in each display pixel 90 to display a desired image by sequentially setting each scanning line in a selected state, applying a predetermined signal voltage to each signal line by the source driver 10, and writing a signal voltage according to the display data to the display pixel 90 in the selected state.

Here, the operation timings of the source driver 10 and the gate driver 30 are controlled by the timing controller 20. The timing controller 20 performs control of applying a predetermined voltage to a pixel electrode of the display pixel 90 at a predetermined timing to display an image based on video signal on the display panel 100 by supplying a control signal for displaying a predetermined image on the display panel 100 to each of the source driver 10 and the gate driver 30 on the basis of the video signal supplied from the outside.

Here, the source driver 10 is composed of a driver IC (driver circuit) that receives a display command including setting data and display data (RGB data) from the timing controller 20 and displays the display data on the display panel 100 on the basis of the setting data. Accordingly, in the following description of this embodiment, the source driver 10 will be described as the driver IC 10.

Before describing the driver IC 10 of this embodiment, a driver IC 10A to which the present disclosure is not applied will be described as a comparative example with reference to FIG. 2. Further, the timing chart in FIG. 3 illustrates changes in various signals and data contents in the driver IC 10A illustrated in FIG. 2.

The driver IC 10A is a driver circuit that receives a display command 103 including setting data and display data from the timing controller 20 and displays the display data on the display panel 100 on the basis of the setting data in the display command 103.

Figure 2:
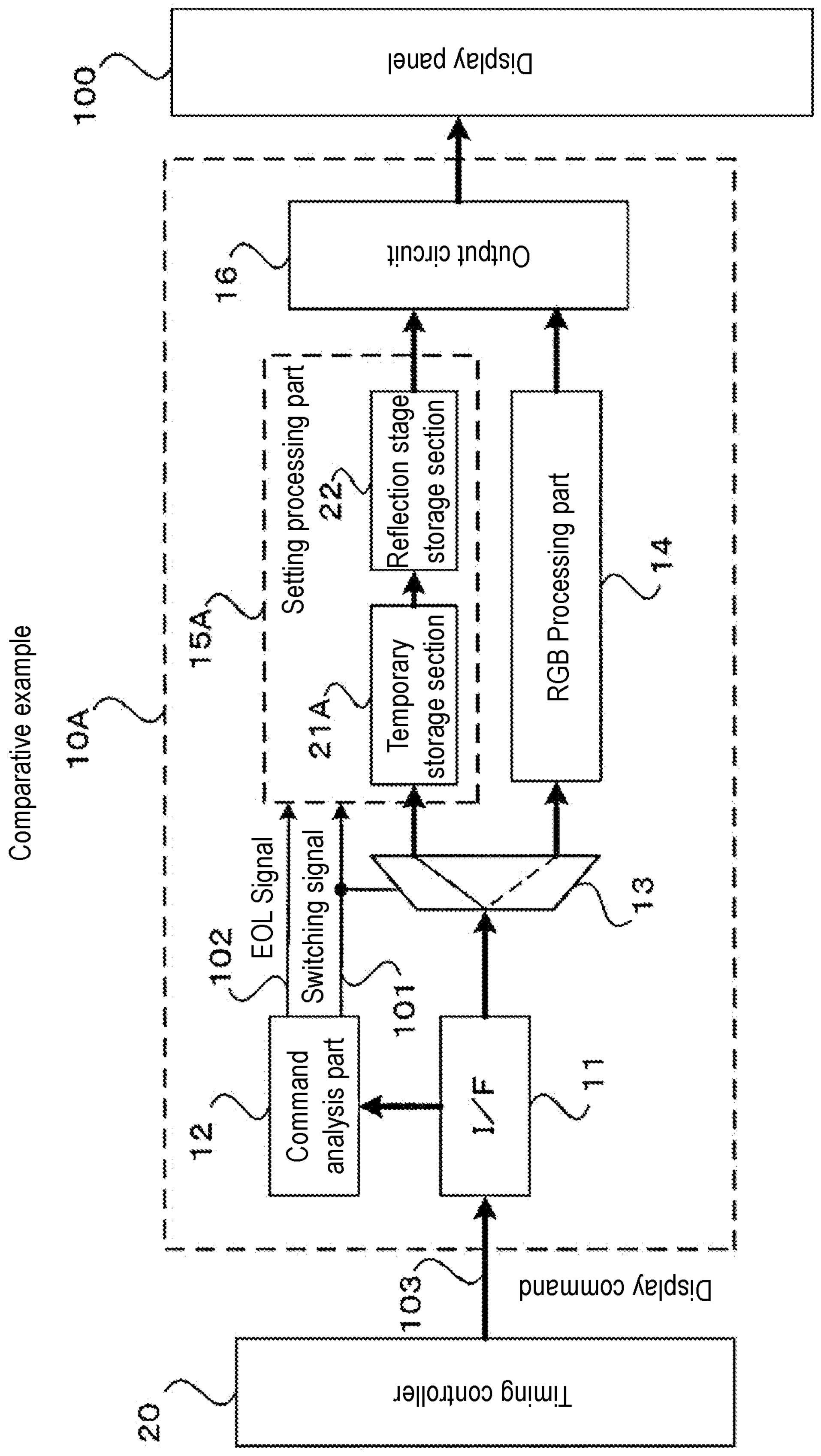
FIG. 2 is a block diagram illustrating a configuration of a driver IC 10A as a comparative example.
Figure 3:
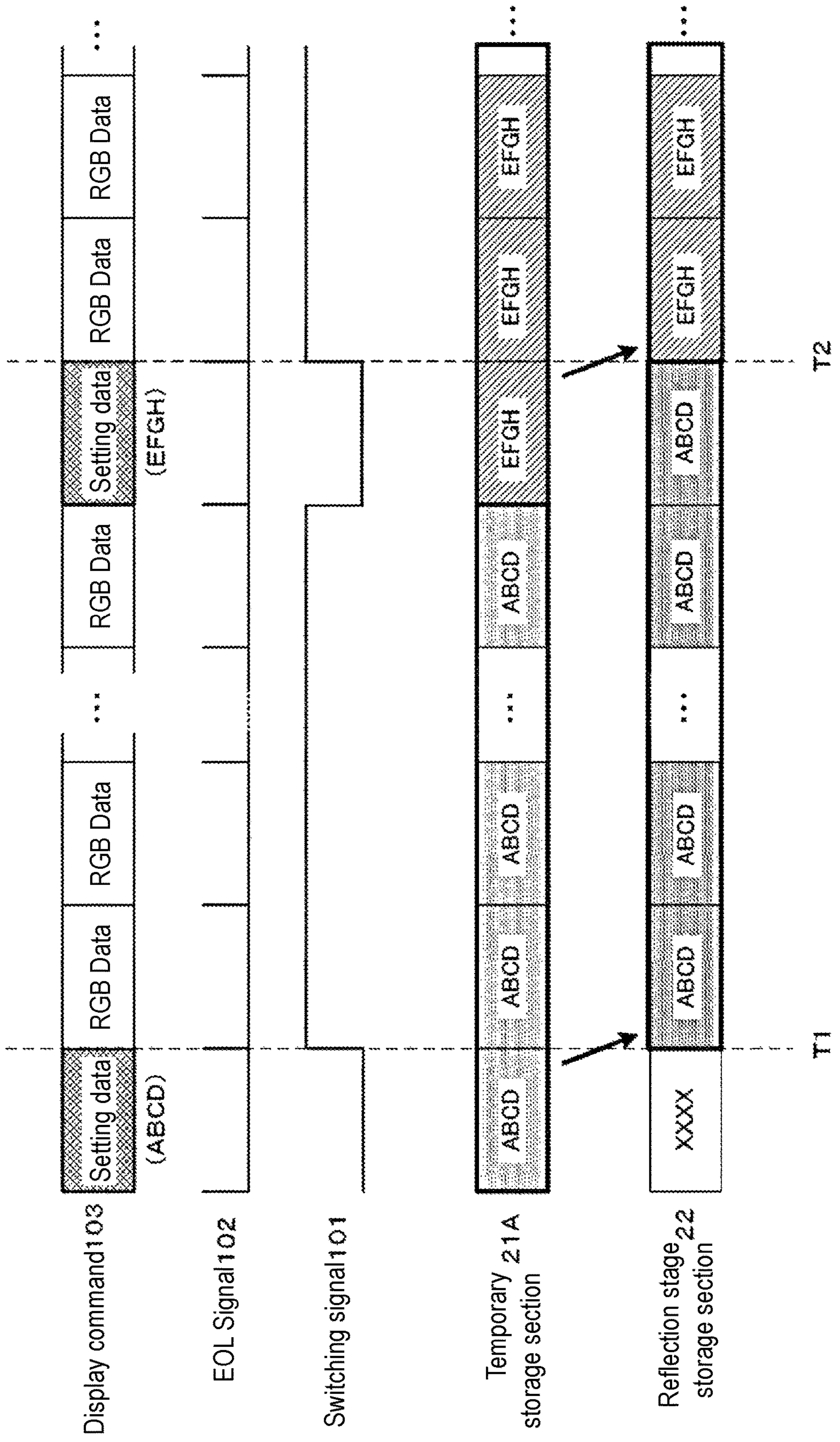
FIG. 3 is a timing chart illustrating changes in various signals and data contents in the driver IC 10A illustrated in FIG. 2.

As illustrated in FIG. 2, the driver IC 10A of the comparative example includes an interface circuit (I/F) 11, a command analysis part 12, a switching circuit 13, an RGB processing part 14, a setting processing part 15A, and an output circuit 16.

The interface circuit 11 receives the display command 103 from the timing controller 20 and transmits the received display command 103 to each of the command analysis part 12 and the switching circuit 13.

Here, as illustrated in FIG. 3, the display command has the RGB data and the setting data set for each line. Here, one line of data is composed of, for example, 20 bytes of data. The command analysis part 12 analyzes the display command 103 transmitted from the interface circuit 11, distinguishes a line portion containing the setting data and a line portion containing the RGB data, and outputs a signal indicating the data type of the data contained in the line as the switching signal 101. Further, the command analysis part 12 outputs a signal synchronized with each line break in the display command 103 as an EOL (End Of Line) signal 102.

Specifically, as illustrated in FIG. 3, the command analysis part 12 sets the switching signal 101 to a low level (hereinafter, abbreviated as L level) in the section in which the transmitted display command 103 is the setting data and sets the switching signal 101 to a high level (hereinafter, abbreviated as H level) in the section in which the transmitted display command 103 is the RGB data.

Furthermore, the display command 103 illustrated in FIG. 3 is configured such that multiple pieces of RGB data are transmitted after the setting data. Then, the RGB data between one setting data and the next setting data is such that an image is displayed on the basis of the setting contents of the certain setting data.

The switching circuit 13 is composed of, for example, a multiplexer, and outputs the display command 103 transmitted from the interface circuit 11 to the setting processing part 15A when the switching signal 101 output from the command analysis part 12 is at L level. Further, the switching circuit 13 outputs the display command 103 transmitted from the interface circuit 11 to the RGB processing part 14 when the switching signal 101 output from the command analysis part 12 is at H level.

The RGB processing part 14 performs image processing on the RGB data output from the switching circuit 13 and transmits the processed data to the output circuit 16. The setting processing part 15A includes a temporary storage section 21A which temporarily stores the setting data contained in the display command 103 until the next setting data is transmitted and a reflection stage storage section 22 which stores the setting data stored in the temporary storage section 21A. In the setting processing part 15A, the setting data output from the switching circuit 13 is first stored in the temporary storage section 21A and then is stored in the reflection stage storage section 22 after the timing of one line of the display command 103.

The output circuit 16 displays the RGB data transmitted from the RGB processing part 14 on the display panel 100 on the basis of the setting data stored in the reflection stage storage section 22.

Referring to the timing chart of FIG. 3, it is assumed that the setting data contained in the display command 103 is "ABCD". Then, this setting data "ABCD" is first stored in the temporary storage section 21A, and is also stored in the reflection stage storage section 22 at the timing when the switching signal 101 becomes H level at time T1. Then, the output circuit 16 performs an operation to display the RGB data from the RGB processing part 14 on the display panel 100 on the basis of the setting data "ABCD" stored in the reflection stage storage section 22.

After that, when the setting data "EFGH" is transmitted from the display command 103, similarly, this setting data "EFGH" is first stored in the temporary storage section 21A, and is also stored in the reflection stage storage section 22 at the timing when the switching signal 101 becomes H level at time T2. Then, the output circuit 16 performs an operation to display the RGB data from the RGB processing part 14 on the display panel 100 on the basis of the setting data "EFGH" stored in the reflection stage storage section 22.

The reason why the setting processing part 15A stores the setting data in the temporary storage section 21A and then stores the setting data in the reflection stage storage section 22 is because the setting data stored in the reflection stage storage section 22 cannot be immediately changed even when new setting data is transmitted from the display command 103. This is because the output circuit 16 performs image display processing on the display panel 100 on the basis of the previous RGB data even at the timing when new setting data is transmitted from the display command 103. Thus, this is because the image display processing needs to be performed on the basis of previous setting data.

Specifically, this is because the setting data "ABCD" still needs to be stored in the reflection stage storage section 22 even at the timing when the setting data "EFGH" is transmitted from the display command 103 illustrated in FIG. 3. This is because the RGB data that should originally be displayed as an image based on the setting data "ABCD" ends up being displayed as an image based on the setting data "EFGH" when the setting data stored in the reflection stage storage section 22 is immediately changed from "ABCD" to "EFGH" at the timing when the setting data "EFGH" is transmitted from the display command 103.

Therefore, even when new setting data is transmitted from the display command 103, the setting data is not immediately stored in the reflection stage storage section 22, but first stored in the temporary storage section 21A and then stored in the reflection stage storage section 22.

Figure 4:
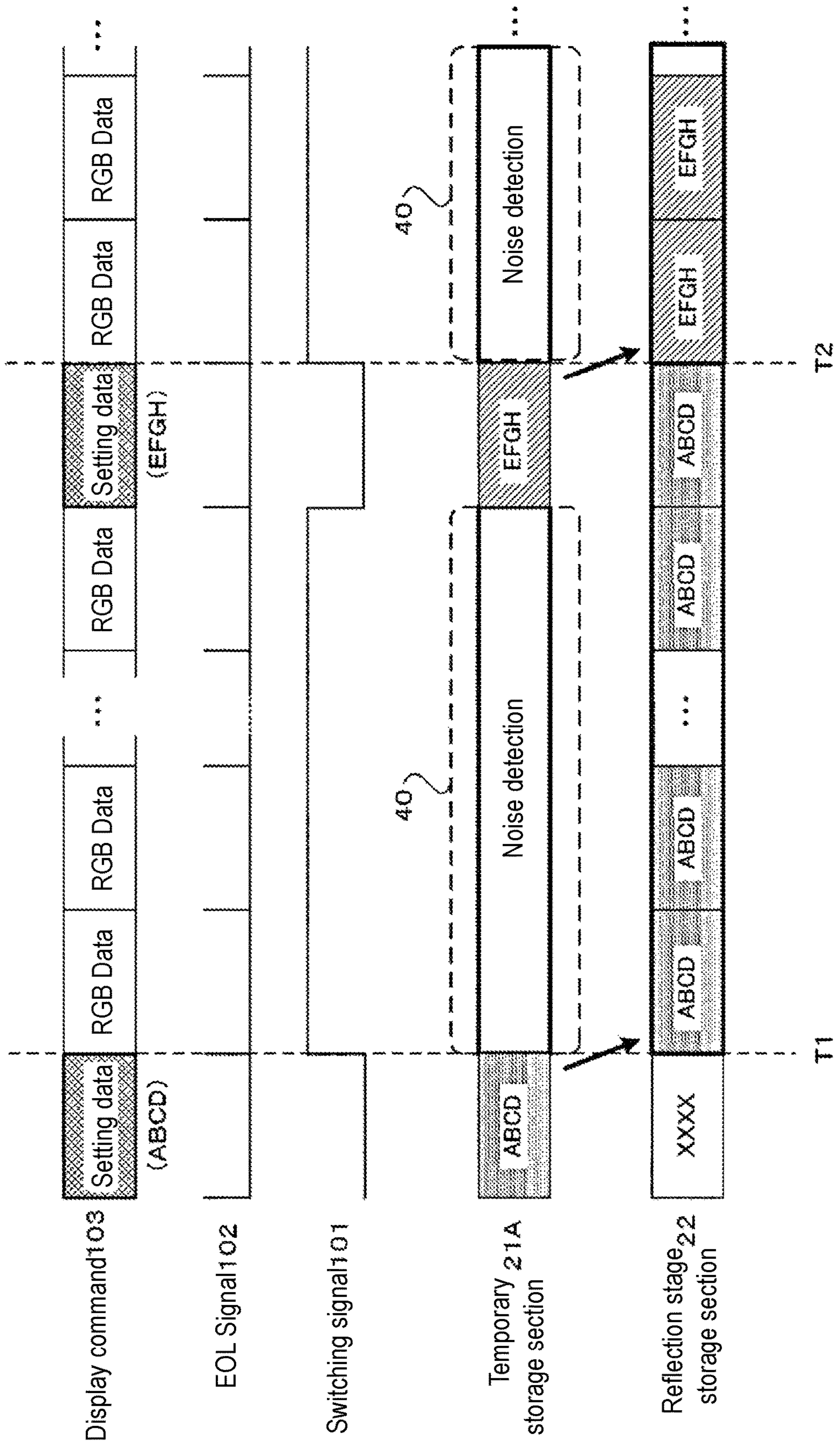
FIG. 4 is a diagram illustrating that noise detection is performed using a storage area of a temporary storage section 21A during a period 40 that is not used for system operation.

As described above, in the setting processing part 15A, the temporary storage section 21A temporarily stores the setting data, but after the setting data is stored in the reflection stage storage section 22, the setting data is not used until the next setting data is transmitted from the display command 103. Therefore, in this embodiment, as illustrated in FIG. 4, noise detection is performed using the storage area of the temporary storage section 21A during a period 40 which is not used for system operation.

Figure 5:
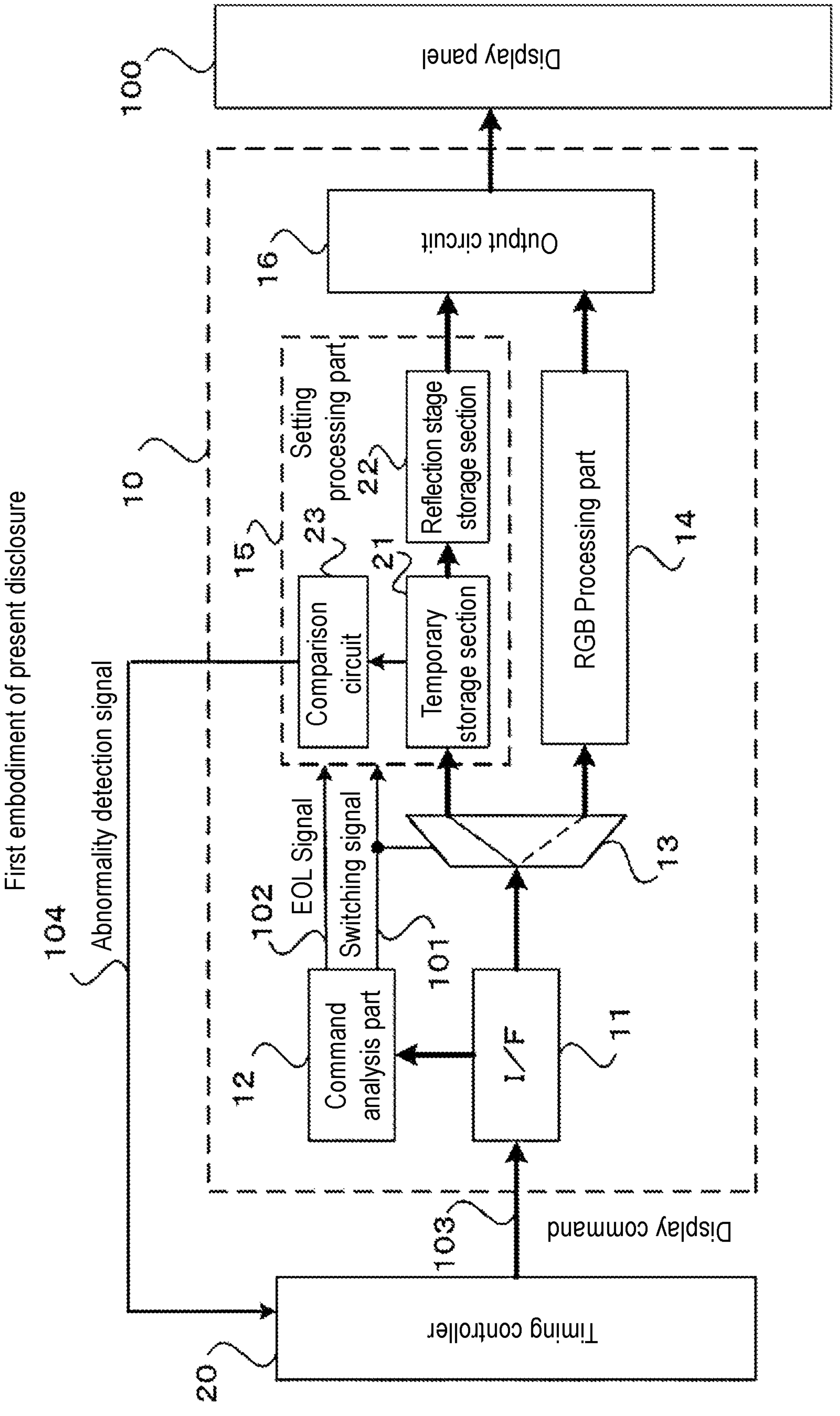
FIG. 5 is a block diagram illustrating a configuration of a driver IC 10 of the first embodiment of the present disclosure.

The configuration of the driver IC 10 in the first embodiment of the present disclosure is illustrated in the block diagram of FIG. 5.

The driver IC 10 of this embodiment illustrated in FIG. 5 has a configuration in which the setting processing part 15A is replaced with a setting processing part 15 in the driver IC 10A of the comparative example illustrated in FIG. 2. Then, the setting processing part 15 has a configuration in which the temporary storage section 21A is replaced with a temporary storage section 21 and a comparison circuit 23 is added to the setting processing part 15A illustrated in FIG. 2.

Furthermore, since the components having the same reference numerals as the components illustrated in FIG. 2 are the same among the components illustrated in FIG. 5, the description thereof will be omitted.

In the driver IC 10 of this embodiment, an abnormality detection signal 104 is output from the comparison circuit 23 of the setting processing part 15 to the timing controller 20. The timing controller 20 performs processing such as rewriting the setting data to the driver IC 10 by inputting the abnormality detection signal 104 to understand the possibility of an abnormality occurred in the setting data stored in the setting processing part 15 due to noise such as ESD noise.

In other words, the abnormality detection signal 104 is a signal indicating the possibility of an abnormality occurred in the setting data stored in the setting processing part 15 due to the occurrence of noise such as ESD noise.

In this way, the timing controller 20 functions as a control circuit that transmits a display command containing the setting data and the display data to the driver IC 10 and receives the abnormality detection signal 104 on the basis of the data comparison result in the temporary storage section 21 from the driver IC 10.

Figure 6:
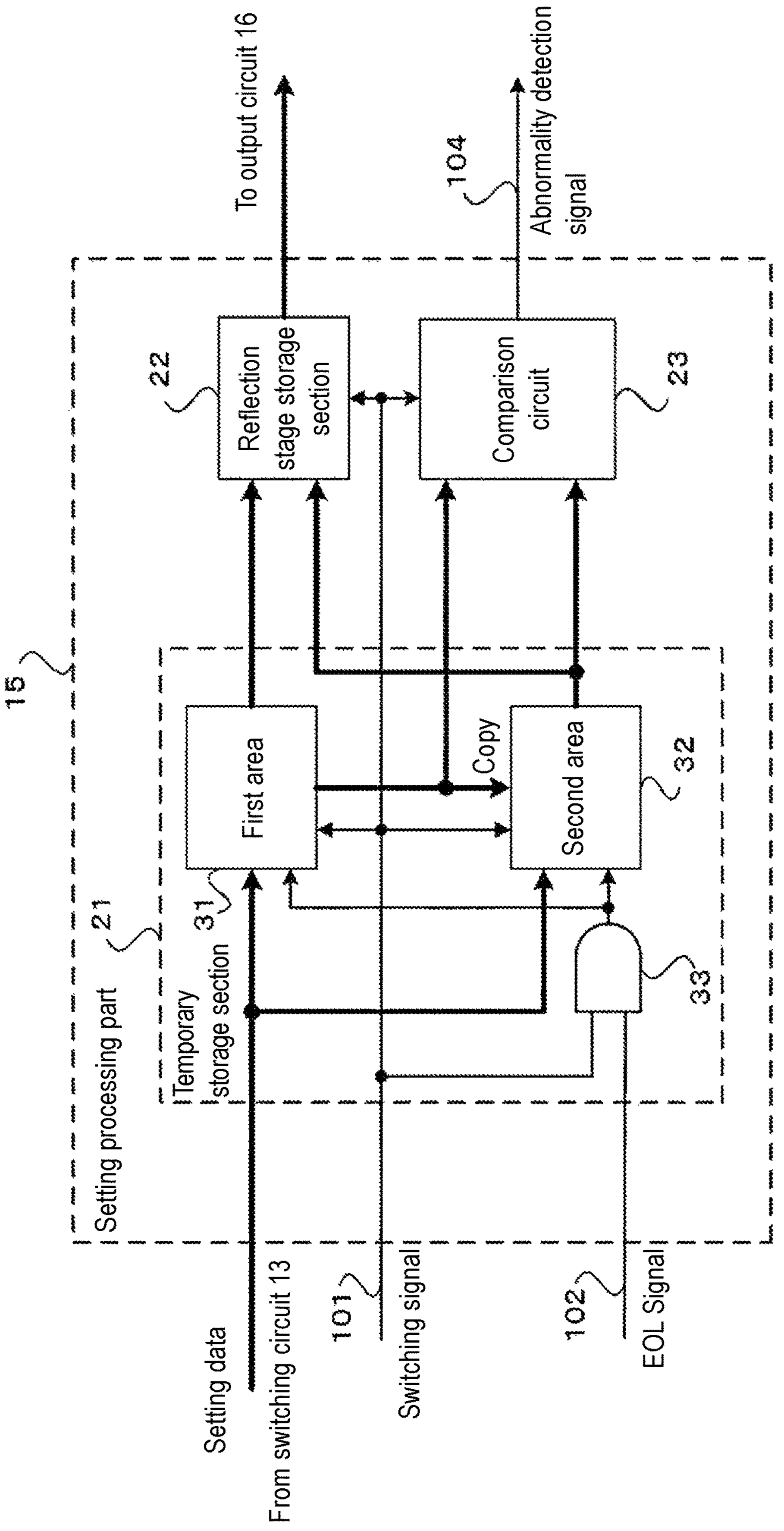
FIG. 6 is a block diagram illustrating details of a configuration of a temporary storage section 21 of the driver IC 10 of the first embodiment of the present disclosure illustrated in FIG. 5.

The details of the configuration of the temporary storage section 21 in the driver IC 10 of this embodiment illustrated in FIG. 5 are illustrated in the block diagram of FIG. 6.

The temporary storage section 21 of this embodiment is divided into a first area 31 that stores a part of setting data and a second area 32 that stores a part other than the setting data stored in the first area 31.

For example, the first area 31 stores the first 10 bytes of 20 bytes of setting data, and the second area 32 stores the latter 10 bytes of 20 bytes of setting data.

Then, the second area 32 stores the transmitted setting data during a period in which the setting data is being transmitted in the display command 103 and copies and stores the data stored in the first area 31 during a period in which RGB data is being transmitted in the display command 103.

Then, the comparison circuit 23 compares the data stored in the first area 31 and the data stored in the second area 32 during a period in which RGB data is being transmitted in the display command 103 and outputs the abnormality detection signal 104 to the timing controller 20 when they do not match.

Here, the period during which RGB data is being transmitted in the display command 103 means the period during which the switching signal 101 is at H level. Further, the period during which setting data is being transmitted in the display command 103 means the period during which the switching signal 101 is at L level.

Furthermore, the temporary storage section 21 is provided with an AND circuit 33 that calculates the logical product of the switching signal 101 and the EOL signal 102. The output of the AND circuit 33 is output to the first area 31 and the second area 32 as a clock signal. Next, the operation of the setting processing part 15 of this embodiment illustrated in FIG. 6 will be described with reference to FIGS. 7 and 8.

Figure 7:
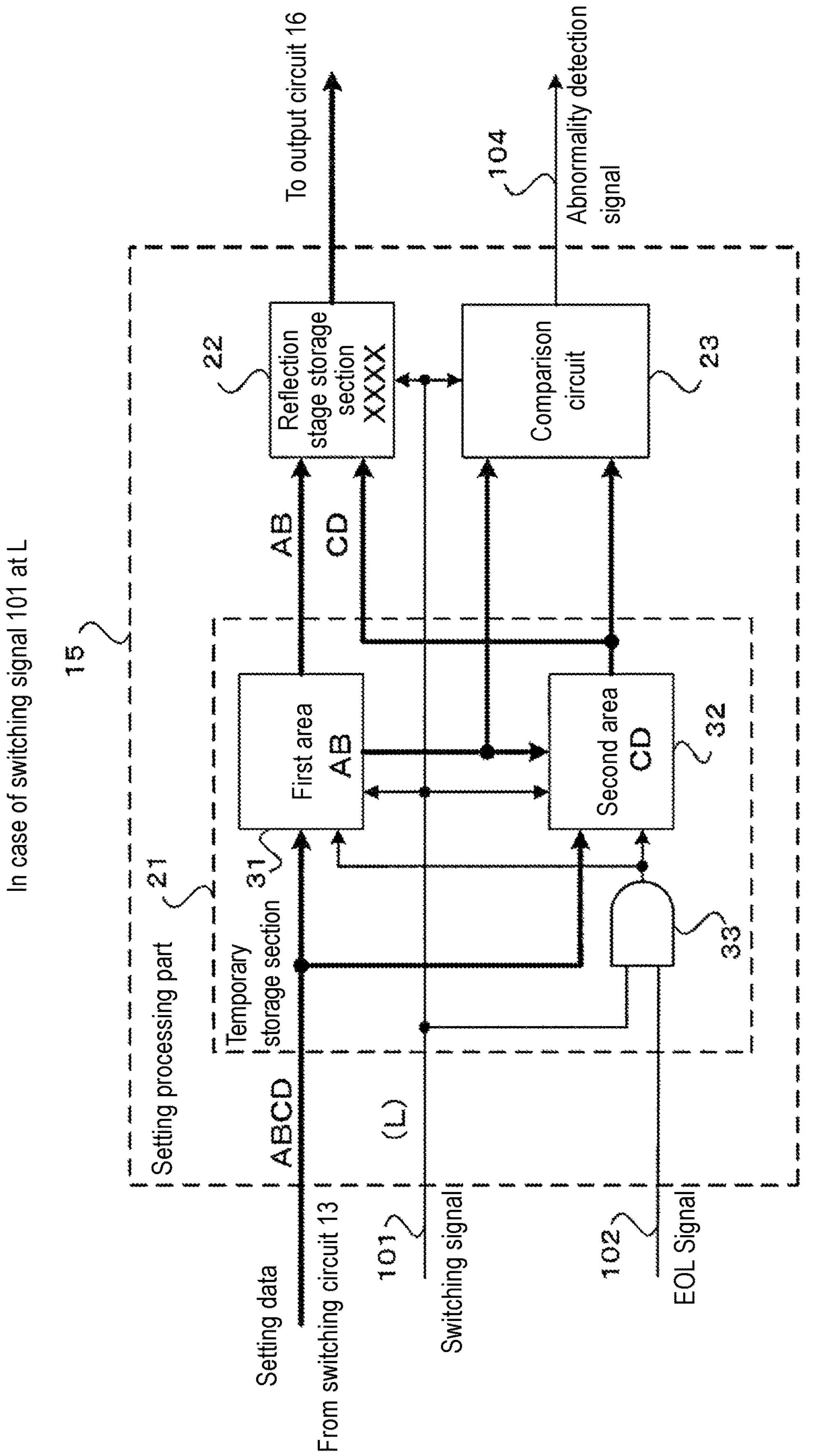
FIG. 7 is a diagram illustrating the operation of a setting processing part 15 illustrated in FIG. 6 when a switching signal 101 is at L level.
Figure 8:
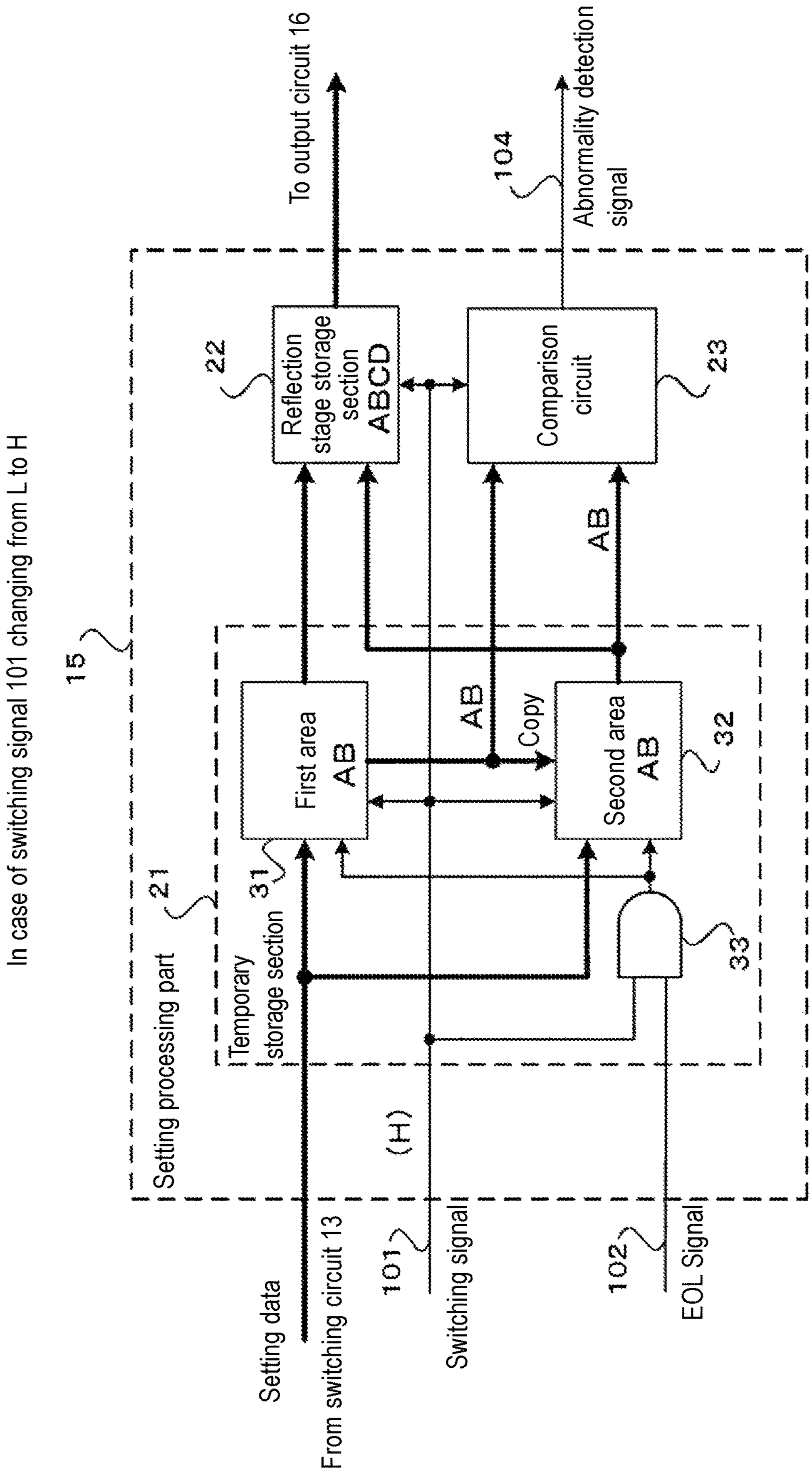
FIG. 8 is a diagram illustrating the operation of the setting processing part 15 illustrated in FIG. 6 when the switching signal 101 changes from L level to H level.

FIG. 7 illustrates the operation when the switching signal 101 is at L level, that is, during a period in which setting data is being transmitted in the display command 103. FIG. 8 illustrates the operation when the switching signal 101 changes from L level to H level, that is, during a period in which RGB data is being transmitted in the display command 103.

First, as illustrated in FIG. 7, when new setting data is transmitted in the display command 103, the switching signal 101 becomes L level. Therefore, for example, when the setting data has the content "ABCD", the portion "AB" of the setting data is stored in the first area 31, and the portion "CD" of the setting data is stored in the second area 32.

Then, as illustrated in FIG. 8, when RGB data is transmitted in the display command 103 and the switching signal 101 changes from L level to H level, the setting data "AB" stored in the first area 31 and the setting data "CD" stored in the second area 32 are taken into the reflection stage storage section 22 to be stored therein. Further, the setting data "AB" stored in the first area 31 is copied and stored in the second area 32.

Then, when the switching signal 101 becomes H level, the comparison circuit 23 compares the data stored in the first area 31 and the data stored in the second area 32. Then, the comparison circuit 23 does not output the abnormality detection signal 104 when the two compared data match, and outputs the abnormality detection signal 104 when the two compared data do not match.

Figure 9:
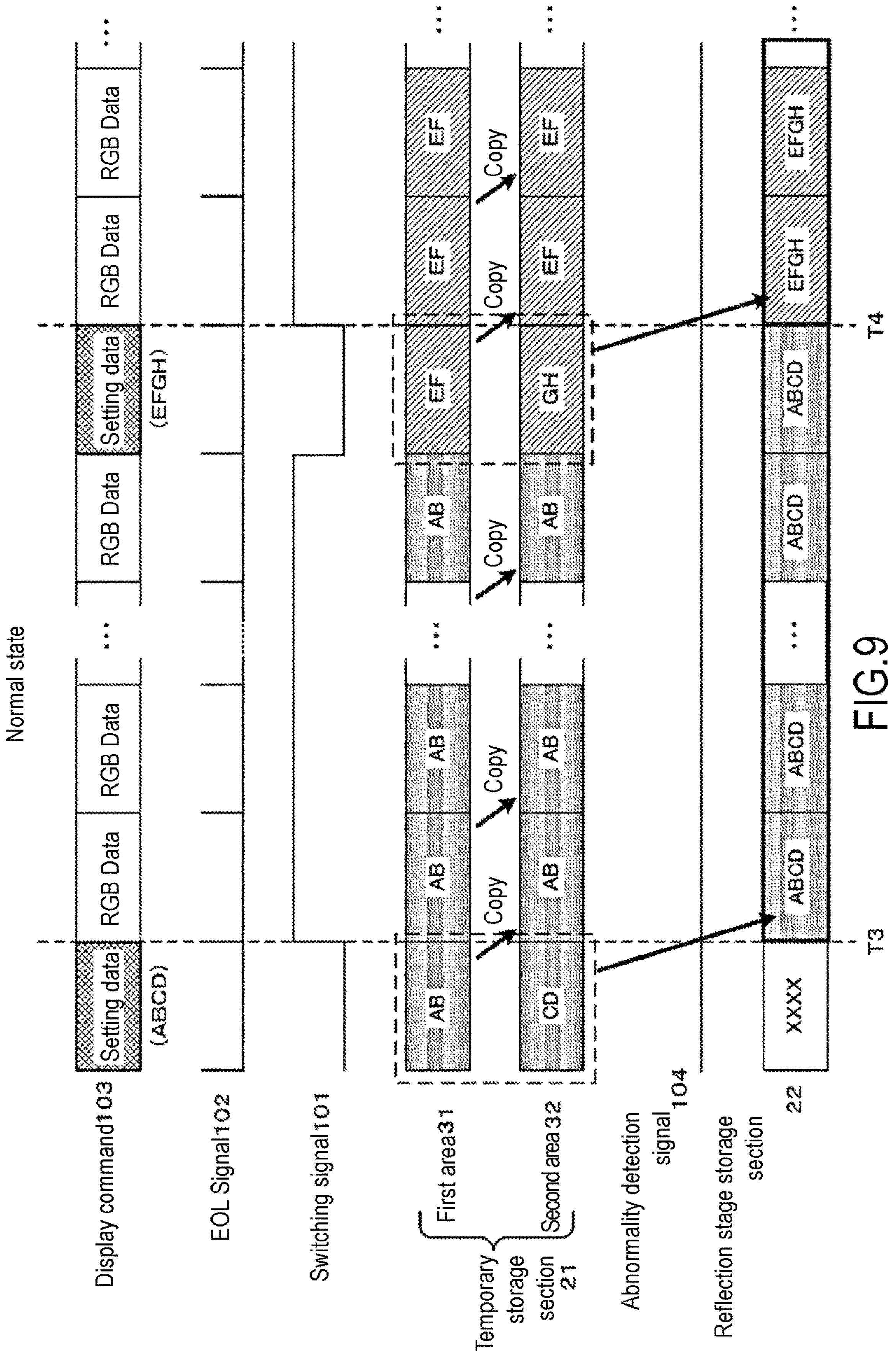
FIG. 9 is a timing chart illustrating changes in various signals and data contents in the driver IC 10 of the first embodiment of the present disclosure in a normal state when noise such as ESD noise does not occur.
Figure 10:
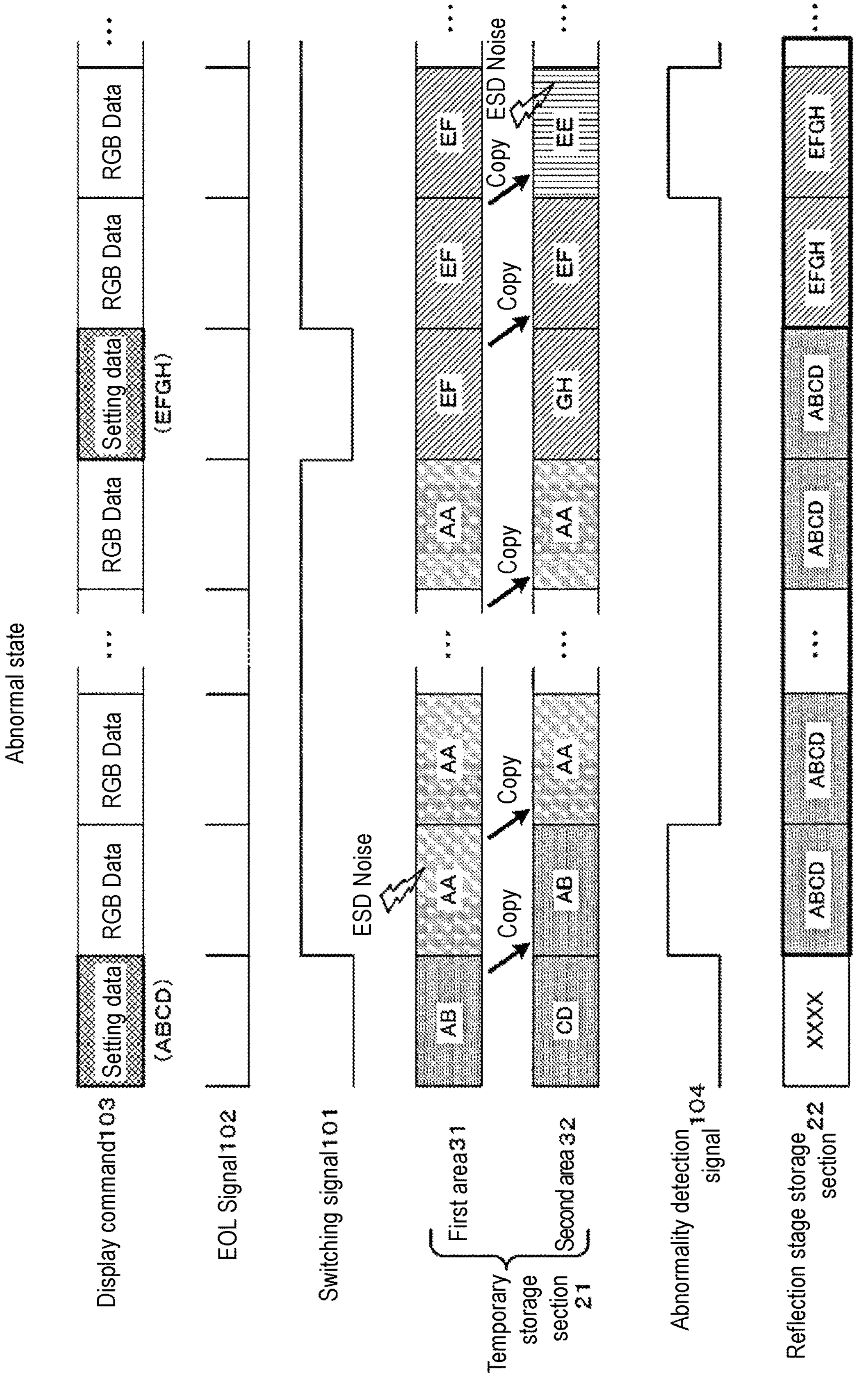
FIG. 10 is a timing chart illustrating changes in various signals and data contents in the driver IC 10 of the first embodiment of the present disclosure in an abnormal state when noise such as ESD noise occurs.

Next, the timing charts of FIGS. 9 and 10 illustrate changes in various signals and data contents in the driver IC 10 of this embodiment illustrated in FIG. 5. FIG. 9 is a timing chart in a normal state when noise such as ESD noise does not occur. Then, FIG. 10 is a timing chart in an abnormal state when noise such as ESD noise occurs.

In a normal state when noise such as ESD noise does not occur, as illustrated in FIG. 9, the setting data "ABCD" transmitted from the display command 103 is stored separately in the first area 31 and second area 32 as "AB" and "CD", respectively.

Then, when the switching signal 101 becomes H level at time T3, the setting data "AB" stored in the first area 31 and the setting data "CD" stored in the second area 32 are stored in the reflection stage storage section 22. Then, at that timing, the setting data "AB" stored in the first area 31 is copied and stored in the second area 32. As a result, the stored content of the first area 31 and the stored content of the second area 32 become the same.

Then, the second area 32 continues to copy and store the data stored in the first area 31 until new setting data "EFGH" is transmitted from the display command 103.

Then, when the switching signal 101 becomes H level, the comparison circuit 23 compares the stored content of the first area 31 and the stored content of the second area 32, but in FIG. 9, since the contents are always the same, the abnormality detection signal 104 is not output.

Next, the operation in an abnormal state when noise such as ESD noise occurs will be described with reference to the timing chart of FIG. 10.

In the timing chart illustrated in FIG. 10, the stored content of the first area 31 has changed from "AB" to "AA" due to ESD noise. Therefore, it can be seen that the comparison circuit 23 determines that the stored content of the first area 31 and the stored content of the second area 32 do not match, and outputs the abnormality detection signal 104. Furthermore, since the stored content of the first area 31 and the stored content of the second area 32 match after the stored content of the first area 31 of "AA" are copied to the second area 32, the abnormality detection signal 104 is not output.

Similarly, FIG. 10 illustrates a state in which the abnormality detection signal 104 is output even when the stored content of the second area 32 changes from "EF" to "EE" due to ESD noise.

Figure 11:
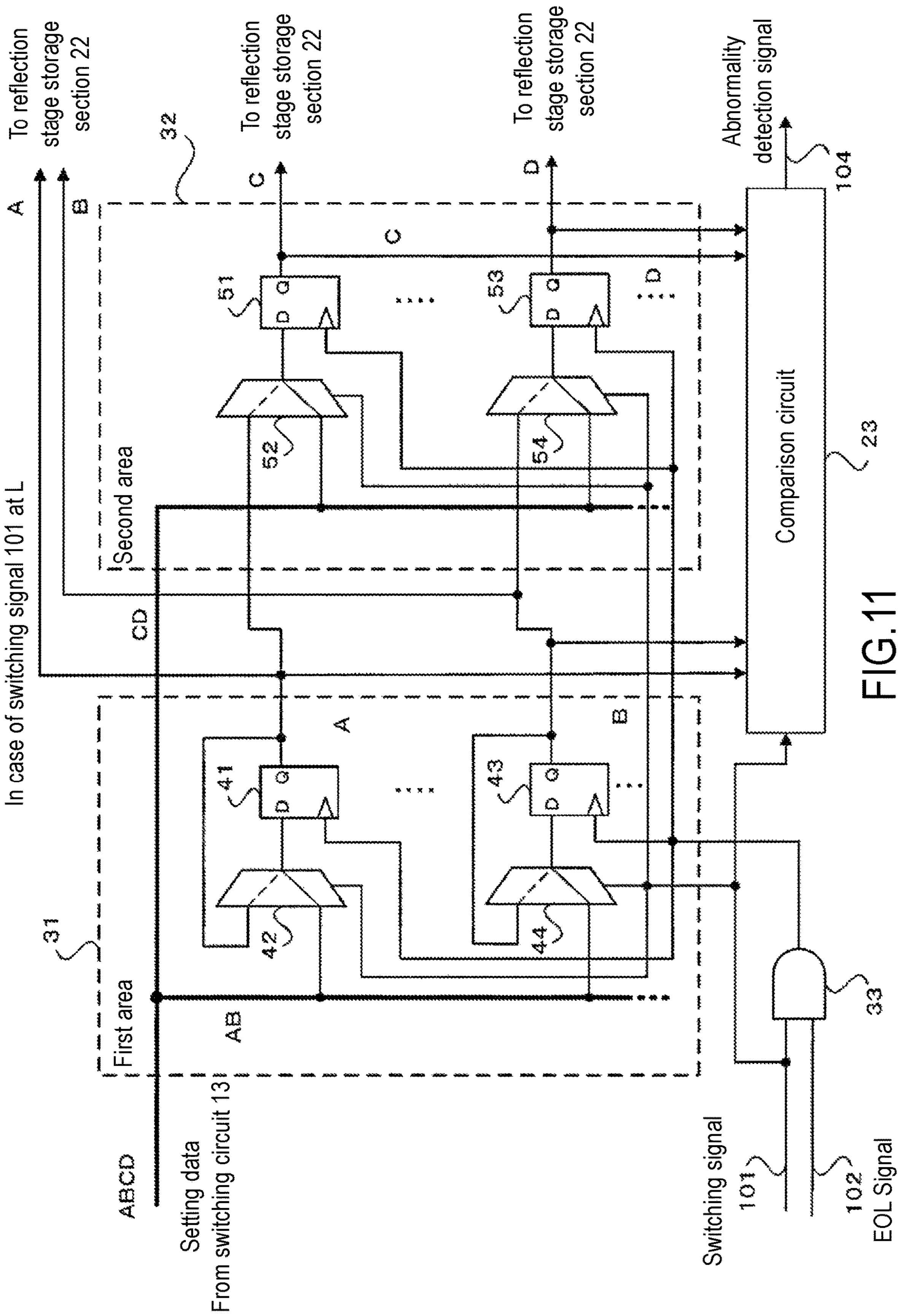
FIG. 11 is a diagram illustrating a specific circuit configuration example of a first area 31 and a second area 32 illustrated in FIG. 6.

Next, a specific circuit configuration example of the first area 31 and the second area 32 illustrated in FIG. 6 is illustrated in FIG. 11.

Referring to FIG. 11, the first area 31 includes a plurality of flip-flop circuits 41 and 43 and a plurality of switching circuits 42 and 44.

The plurality of flip-flop circuits 41 and 43 are connected in parallel to hold setting data. Then, the plurality of flip-flop circuits 41 are provided to hold the first half of the setting data, and the plurality of flip-flop circuits 43 are provided to hold the second half of the setting data.

For example, when the setting data is 20 bytes, that is, 160 bits, 80 flip-flop circuits 41 and 43 are each provided.

Then, the plurality of switching circuits 42 and 44 output the transmitted setting data to the input terminals of the plurality of flip-flop circuits 41 and 43, respectively, during a period in which the setting data is being transmitted in the display command 103. Further, the plurality of switching circuits 42 and 44 directly output the values of the output terminals of the plurality of flip-flop circuits 41 and 43 to their input terminals, respectively, during a period in which RGB data is being transmitted in the display command 103.

That is, when the switching signal 101 is at L level, the switching circuits 42 and 44 output the transmitted setting data to the input terminals of the plurality of flip-flop circuits 41 and 43, respectively. Then, when the switching signal 101 is at H level, the switching circuits 42 and 44 directly output the values of the output terminals of the flip-flop circuits 41 and 43 to the input terminals.

Then, as illustrated in FIG. 11, the second area 32 includes a plurality of flip-flop circuits 51 and 53 and a plurality of switching circuits 52 and 54.

The plurality of flip-flop circuits 51 and 53 are connected in parallel to hold setting data.

Then, the plurality of flip-flop circuits 51 are provided to hold the first half of the setting data, and the plurality of flip-flop circuits 53 are provided to hold the second half of the setting data.

Then, the plurality of switching circuits 52 and 54 output the transmitted setting data to the input terminals of the flip-flop circuits 51 and 53, respectively, during a period in which the setting data is being transmitted in the display command 103. Further, the plurality of switching circuits 52 and 54 output the values of the output terminals of the plurality of flip-flop circuits 41 and 43 in the first area 31 to the input terminals of the plurality of flip-flop circuits 51 and 53, respectively, during a period in which RGB data is being transmitted in the display command 103.

That is, when the switching signal 101 is at L level, the switching circuits 52 and 54 output the transmitted setting data to the input terminals of the plurality of flip-flop circuits 51 and 53, respectively. Then, when the switching signal 101 is at H level, the switching circuits 52 and 54 output the values of the output terminals of the flip-flop circuits 41 and 43 to the input terminals of the plurality of flip-flop circuits 51 and 53, respectively.

Since the first area 31 and the second area 32 are configured as described above, Data "A" among the setting data "ABCD" is held in the plurality of flip-flop circuits 41 when the switching signal 101 is at the L level as illustrated in FIG. 11. Furthermore, data "B" is held in the plurality of flip-flop circuits 43. Further, data "C" is held in the plurality of flip-flop circuits 51, and data "D" is held in the plurality of flip-flop circuits 53.

Then, the data "A", "B", "C", and "D" held in the plurality of flip-flop circuits 41, 43, 51, and 53, respectively, are also output to the reflection stage storage section 22.

Figure 12:
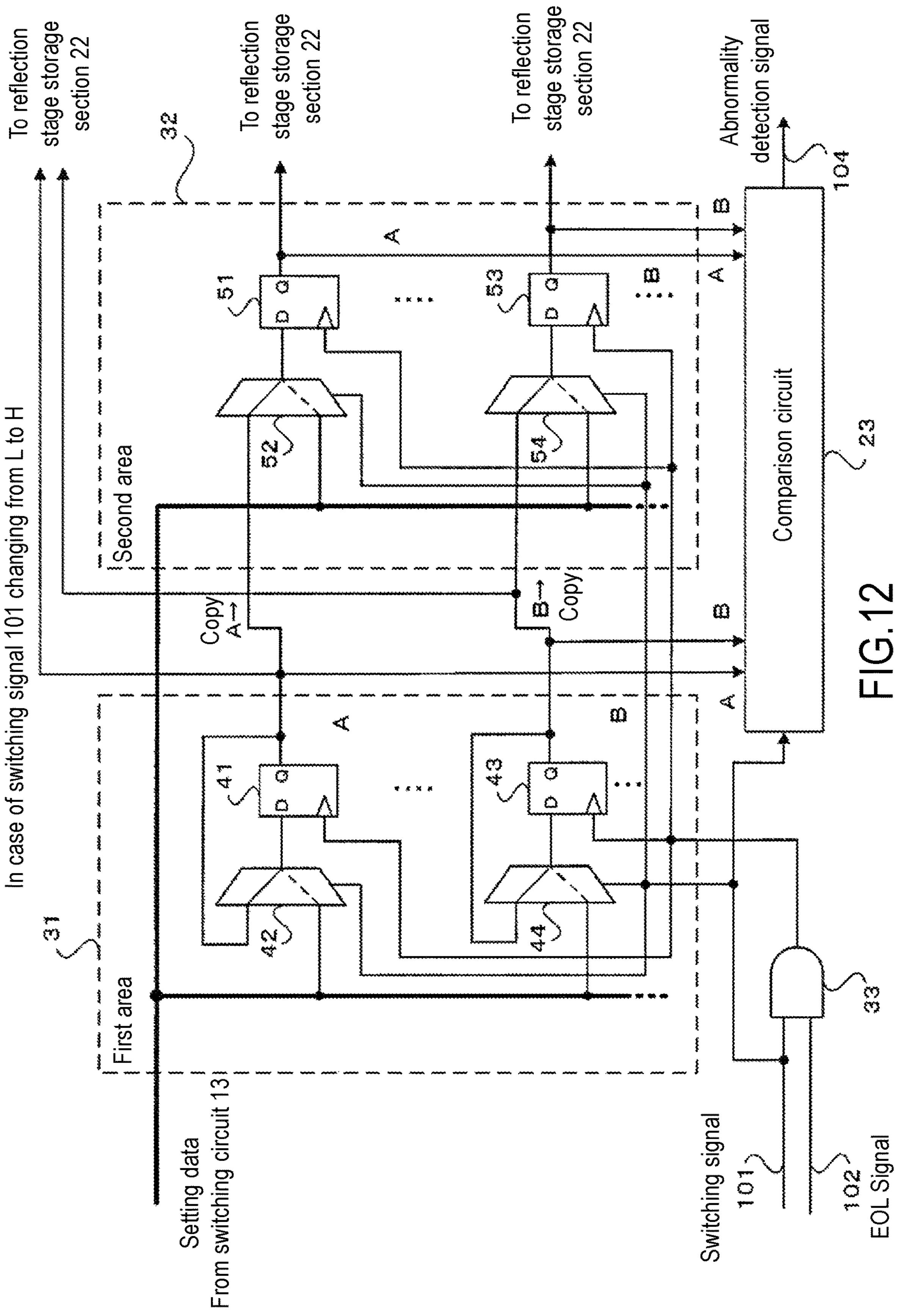
FIG. 12 is a diagram illustrating the operations of the first area 31 and the second area 32 when a switching signal 101 changes from L level to H level.

Next, FIG. 12 illustrates a state when the switching signal 101 changes from L level to H level.

As the switching signal 101 changes from L level to H level, in the first area 31, the switching circuits 42 and 44 directly output the values of the output terminals of the flip-flop circuits 41 and 43 to the input terminals. As a result, the plurality of flip-flop circuits 41 continue to hold data "A", and the plurality of flip-flop circuits 43 continue to hold data "B".

Then, as the switching signal 101 changes from L level to H level, in the second area 32, the switching circuits 52 and 54 output the values of the output terminals of the flip-flop circuits 41 and 43 to the input terminals of the plurality of flip-flop circuits 51 and 53, respectively. As a result, data "A" is copied to the plurality of flip-flop circuits 51, and data "B" is copied to the plurality of flip-flop circuits 53.

Furthermore, as the switching signal 101 changes from L level to H level, the comparison circuit 23 compares data "A" and "B" output from the flip-flop circuits 41 and 43 in the first area 31 and data "A" and "B" output from the flip-flop circuits 51 and 53 in the second area 32 and outputs the abnormality detection signal 104 when the data do not match.

Figure 13:
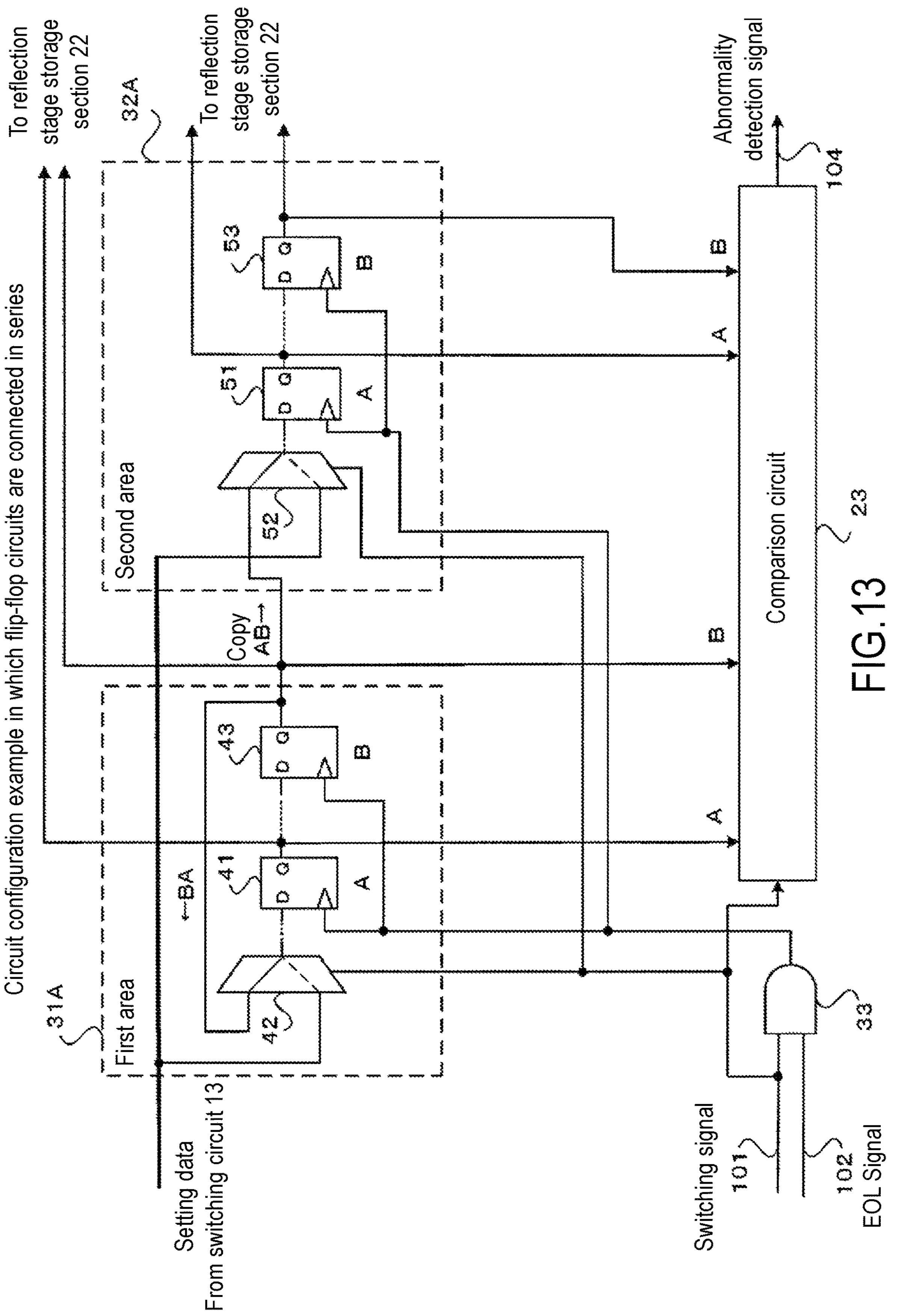
FIG. 13 is a diagram illustrating another specific circuit configuration example of the first area 31 and the second area 32 illustrated in FIG. 6 as a first area 31A and a second area 32A.

Next, another specific circuit configuration example of the first area 31 and the second area 32 illustrated in FIG. 6 is illustrated in FIG. 13 as a first area 31A and a second area 32A.

Referring to FIG. 13, the first area 31A includes the plurality of flip-flop circuits 41 and 43 and the switching circuit 42.

The plurality of flip-flop circuits 41 and 43 are connected in series to hold setting data. Then, the plurality of flip-flop circuits 41 are provided to hold the first half of the setting data, and the plurality of flip-flop circuits 43 are provided to hold the second half of the setting data.

The switching circuit 42 sequentially outputs the transmitted setting data to the plurality of flip-flop circuits 41 and 43 during a period in which the setting data is being transmitted in the display command 103. Further, the switching circuit 42 directly sequentially outputs the values output from the plurality of flip-flop circuits 41 and 43 to the plurality of flip-flop circuits 41 and 43 during a period in which RGB data is being transmitted in the display command 103.

Then, as illustrated in FIG. 13, the second area 32A includes the plurality of flip-flop circuits 51 and 53 and the switching circuit 52.

The plurality of flip-flop circuits 51 and 53 are connected in series to hold setting data. Then, the plurality of flip-flop circuits 51 are provided to hold the first half of the setting data, and the plurality of flip-flop circuits 53 are provided to hold the second half of the setting data.

The switching circuit 52 sequentially outputs the transmitted setting data to the plurality of flip-flop circuits 51 and 53 during a period in which the setting data is being transmitted in the display command 103. Further, the switching circuit 52 sequentially outputs the values output from the plurality of flip-flop circuits 41 and 43 of the first area 31A to the plurality of flip-flop circuits 51 and 53 during a period in which RGB data is being transmitted in the display command 103.

According to the circuit configuration of the first area 31A and the second area 32A illustrated in FIG. 13, since this configuration can be configured with only one switching circuit 42 and one switching circuit 52 compared to the circuit configuration of the first area 31 and the second area 32 illustrated in FIG. 11, there is an advantage that the circuit configuration is simplified.

Furthermore, in the above-described embodiment, although the first areas 31 and 31A and the second areas 32 and 32A are configured using flip-flop circuits, they may also be configured using a memory element such as a RAM.

Then, in this embodiment, since the temporary storage section 21 used in the original system operation is used to detect the occurrence of noise such as ESD noise, there is no need to provide a register such as a flip-flop circuit to detect the occurrence of noise. Therefore, according to this embodiment, it is possible to detect the possibility of an abnormality occurred in the stored setting data without providing a register for abnormality detection. In other words, noise detection is possible without significantly increasing the circuit configuration and circuit area.

Further, according to this embodiment, since noise detection is originally performed using the temporary storage section 21 located close to the reflection stage storage section 22, it is possible to detect with higher accuracy that the setting data stored in the reflection stage storage section 22 has changed due to the influence of noise.

Second Embodiment

Next, an image display system of a second embodiment of the present disclosure will be described.

Figure 14:
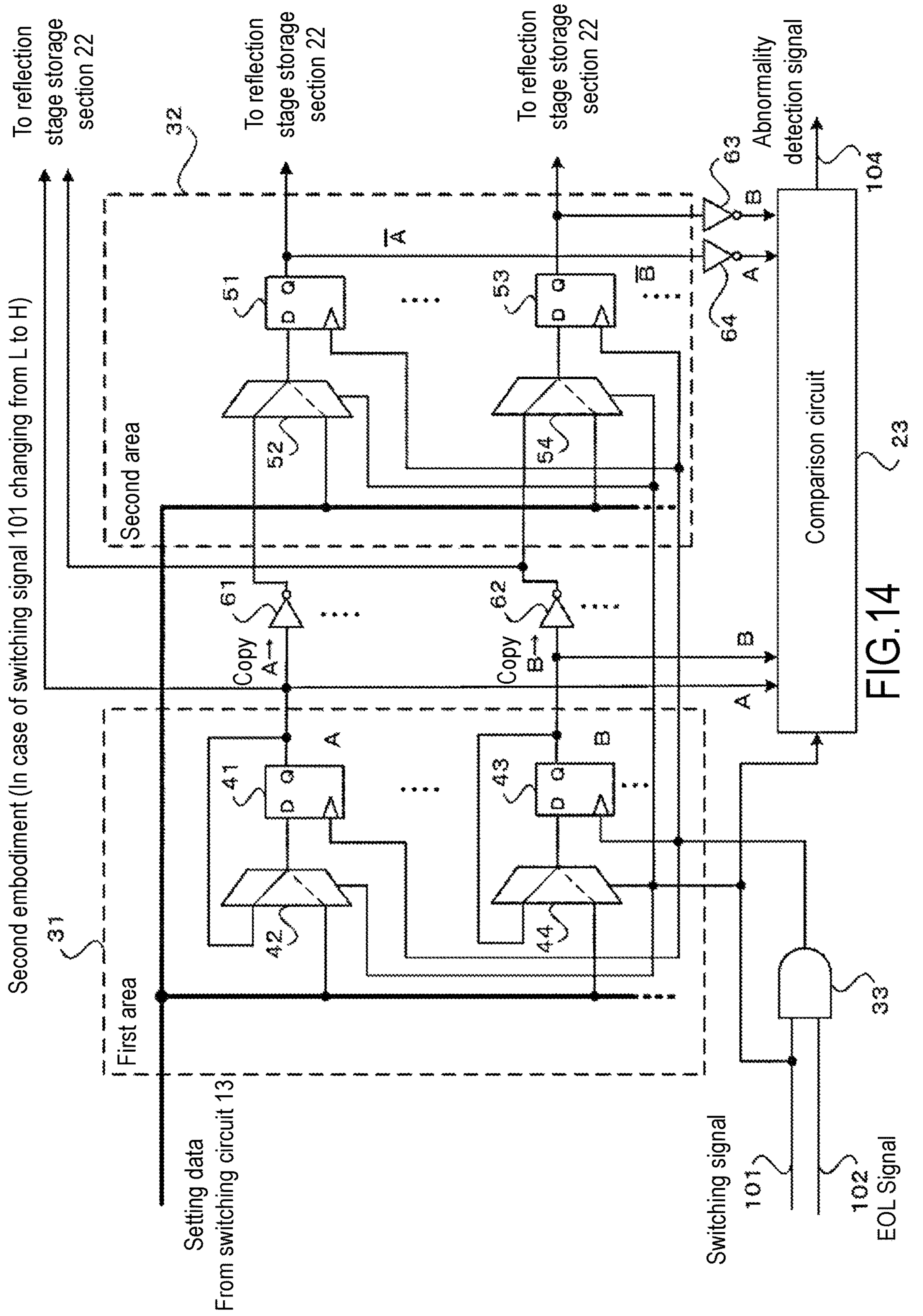
FIG. 14 is a diagram illustrating a specific circuit configuration example of a first area 31 and a second area 32 in which flip-flop circuits of a second embodiment of the present disclosure are connected in parallel.
Figure 15:
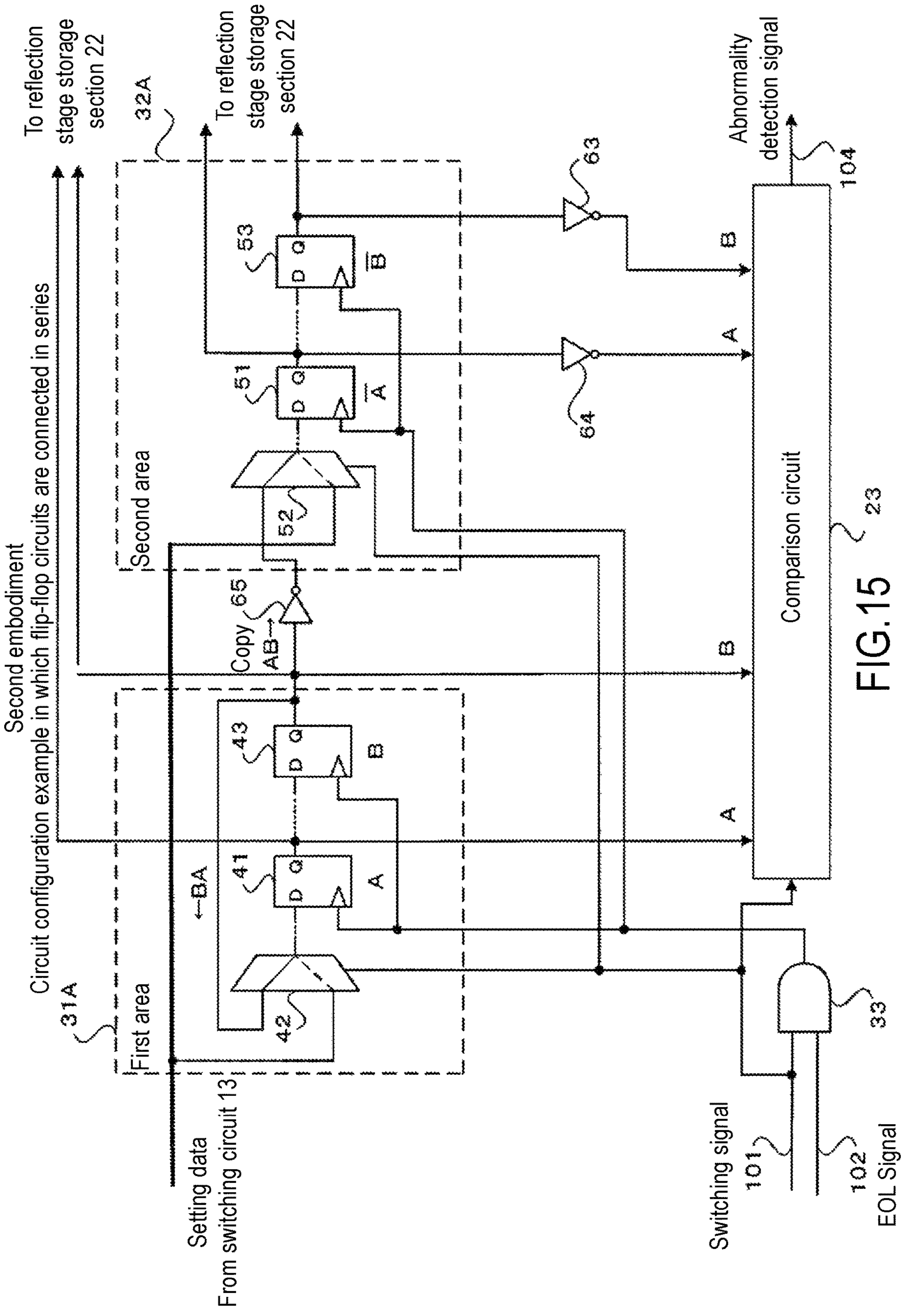
FIG. 15 is a diagram illustrating a specific circuit configuration example of the first area 31 and the second area 32 in which the flip-flop circuits of the second embodiment of the present disclosure are connected in series.

An image display system of this embodiment is different from the first embodiment described above only in that the circuit configuration in the temporary storage section 21 is as illustrated in FIG. 14 or 15. Therefore, in the description of the image display system of this embodiment, only the circuit configuration that is different from the first embodiment described above will be described.

In the image display system of the first embodiment described above, during a period in which the display data is being transmitted in the display command, the data stored in the first area 31 is copied and stored in the second area 32 and the abnormality detection signal 104 is output by determining that an abnormality has occurred when the data stored in the first area 31 and the data stored in the second area 32 do not match.

However, when the setting data transmitted from the display command is all data "1" such as "1111 . . . 1", the data stored in the first area 31 and the second area 32 are also all "1111 . . . 1". Therefore, even when an abnormality occurs in which the data in the storage area changes from "0" to "1" due to the occurrence of noise such as ESD noise, the occurrence of such an abnormality cannot be detected. Similarly, when the setting data transmitted from the display command is all data "0" such as "0000 . . . 0", the data stored in the first area 31 and the second area 32 are also all "0000 . . . 0". Therefore, even when an abnormality occurs in which the data in the storage area changes from "1" to "0" due to the occurrence of noise such as ESD noise, the occurrence of such an abnormality cannot be detected.

Therefore, in this embodiment, in the temporary storage section 21, the data stored in the first area 31 is not simply copied and stored in the second area 32, but the second area 32 stores the data stored in the first area 31 in a logically inverted manner during a period in which display data is being transmitted in the display command.

Then, the comparison circuit 23 compares the data stored in the first area 31 and the data obtained by logically inverting the data stored in the second area 32 during a period in which display data is being transmitted in the display command and outputs the abnormality detection signal 104 indicating the possibility of an abnormality occurred in the stored setting data when they do not match.

FIG. 14 illustrates an example of a circuit configuration when this embodiment is applied to the first area 31 and the second area 32 as illustrated in FIG. 12, which have a configuration in which flip-flop circuits are connected in parallel.

The circuit configuration illustrated in FIG. 14 has a configuration in which a plurality of inverter circuits 61 to 64 are added to the circuit configuration illustrated in FIG. 11.

The plurality of inverter circuits 61 and 62 logically invert the data read from the first area 31 and output the inverted data to the second area 32. Further, the plurality of inverter circuits 63 and 64 logically invert the data read from the second area 32 and output the inverted data to the comparison circuit 23.

Then, during a period in which RGB data is being transmitted in the display command 103, the plurality of switching circuits 52 and 54 respectively output the values obtained by logically inverting the values of the output terminals of the plurality of flip-flop circuits 41 and 43 of the first area 31 using the plurality of inverter circuits 61 and 62 to the input terminals of the plurality of flip-flop circuits 51 and 53.

Even in the first area 31 of this embodiment, the plurality of flip-flop circuits 41 continue to hold data “A”, and the plurality of flip-flop circuits 43 continue to hold data “B”. However, in the second area 32, data obtained by logically inverting “A” is copied to the plurality of flip-flop circuits 51 and data obtained by logically inverting “B” is copied to the plurality of flip-flop circuits 53. Furthermore, in FIG. 14, data obtained by logically inverting “A” is expressed as “/A (A bar)” and data obtained by logically inverting “B” is expressed as “/B (B bar)”. For example, when the data “A” is data “10110110 . . . 1”, the plurality of flip-flop circuits 51 hold data “01001001 . . . 0”.

With such a circuit configuration, according to the image display system of this embodiment, even when the setting data is “111 . . . 1” or “0000 . . . 0”, the data for abnormality detection will always contain both values of “1” and “0”. As a result, according to this embodiment, even when an abnormality occurs in which the data in the storage area changes from “1” to “0” due to the occurrence of noise such as ESD noise, it is possible to detect abnormalities in any case where an abnormality changes from “0” to “1”. Therefore, according to this embodiment, it is possible to improve the detection accuracy during abnormality detection compared to the first embodiment described above.

Furthermore, FIG. 15 illustrates a circuit configuration example when this embodiment is applied to the first area 31A and the second area 32A as illustrated in FIG. 13, which have a configuration in which flip-flop circuits are connected in series.

The circuit configuration illustrated in FIG. 15 has a configuration in which one inverter circuit 65 and a plurality of inverter circuits 63 and 64 are added to the circuit configuration illustrated in FIG. 13.

The inverter circuit 65 logically inverts the data read from the first area 31A and outputs the inverted data to the second area 32A. Further, the plurality of inverter circuits 63 and 64 logically invert the data read from the second area 32A and output the inverted data to the comparison circuit 23.

Further, during a period in which RGB data is being transmitted in the display command 103, the switching circuit 52 in the circuit illustrated in FIG. 15 sequentially outputs the values obtained by logically inverting the values output from the plurality of flip-flop circuits 41 and 43 of the first area 31A using the inverter circuit 65 to the plurality of flip-flop circuits 51 and 53.

Even in such a circuit configuration, according to the image display system of this embodiment, even when the setting data is “111 . . . 1” or “0000 . . . 0”, the data for abnormality detection will always contain both values of “1” and “0”. As a result, according to this embodiment, even when an abnormality occurs in which the data in the storage area changes from “1” to “0” due to the occurrence of noise such as ESD noise, it is possible to detect abnormalities in any case where an abnormality changes from “0” to “1”. Therefore, according to this embodiment, it is possible to improve the detection accuracy during abnormality detection compared to the first embodiment described above.

What is claimed is:

1. A driver circuit, configured to receive a display command containing setting data and display data and display the display data on a display panel based on the setting data, comprising:

a setting processing part that includes a temporary storage section temporarily storing the setting data contained in the display command until another setting data is transmitted to the temporary storage section and a reflection stage storage section storing the setting data stored in the temporary storage section; and an output circuit that displays the display data contained in the display command on the display panel based on the setting data stored in the reflection stage storage section, wherein the temporary storage section is divided into a first area storing a part of the setting data and a second area storing a part other than the setting data stored in the first area, wherein the second area stores the setting data during a period in which the setting data is being transmitted in the display command and stores data that are same as data stored in the first area during a period in which the display data is being transmitted in the display command, and wherein the setting processing part further includes a comparison circuit that compares the data stored in the first area with data stored in the second area during a period in which the display data is being transmitted in the display command and outputs an abnormality detection signal indicating a possibility of an abnormality in the setting data when the data do not match.

2. The driver circuit according to claim 1, wherein the first area includes a plurality of first flip-flop circuits that are connected in parallel to hold the setting data, and a plurality of first switching circuits that output the setting data to input terminals of the plurality of first flip-flop circuits during a period in which the setting data is being transmitted in the display command and directly output values of output terminals of the plurality of first flip-flop circuits to the input terminals during a period in which the display data is being transmitted in the display command, and wherein the second area includes a plurality of second flip-flop circuits that are connected in parallel to hold the setting data, and a plurality of second switching circuits that output the setting data to input terminals of the plurality of second flip-flop circuits during a period in which the setting data is being transmitted in the display command and output values of output terminals of the plurality of first flip-flop circuits of the first area to the input terminals of the plurality of second flip-flop circuits during a period in which the display data is being transmitted in the display command.

3. The driver circuit according to claim 1, wherein the first area includes a plurality of first flip-flop circuits that are connected in series to hold the setting data, and a first switching circuit that sequentially outputs the setting data to the plurality of first flip-flop circuits during a period in which the setting data is being transmitted in the display command and directly sequentially outputs values output from the plurality of first flip-flop circuits to the plurality of first flip-flop circuits during a period in which the display data is being transmitted in the display command, and wherein the second area includes a plurality of second flip-flop circuits that are connected in series to hold the setting data, and a second switching circuit that sequentially outputs the setting data to the plurality of second flip-flop circuits during a period in which the setting data is being transmitted in the display command and sequentially outputs values output from the plurality of first flip-flop circuits of the first area to the plurality of second flip-flop circuits during a period in which the display data is being transmitted in the display command.

4. The driver circuit according to claim 1, wherein the second area stores data that are same as data stored in the first area in a logically inverted manner during a period in which the display data is being transmitted in the display command, and wherein the comparison circuit compares the data stored in the first area with data obtained by logically inverting the data stored in the second area during a period in which the display data is being transmitted in the display command and outputs an abnormality detection signal indicating the possibility of an abnormality in the stored data when the data do not match.

5. The driver circuit according to claim 4, further comprising:

a plurality of first inverter circuits that logically invert data read from the first area and output the inverted data to the second area; and a plurality of second inverter circuits that logically invert data read from the second area and output the inverted data to the comparison circuit, wherein the first area includes a plurality of first flip-flop circuits that are connected in parallel to hold the setting data, and a plurality of first switching circuits that output the setting data to input terminals of the plurality of first flip-flop circuits during a period in which the setting data is being transmitted in the display command and directly output values of output terminals of the plurality of first flip-flop circuits to the input terminals during a period in which the display data is being transmitted in the display command, and wherein the second area includes a plurality of second flip-flop circuits that are connected in parallel to hold the setting data, and a plurality of second switching circuits that output the setting data to input terminals of the plurality of second flip-flop circuits during a period in which the setting data is being transmitted in the display command and output values obtained by logically inverting the values of the output terminals of the plurality of first flip-flop circuits of the first area using the plurality of first inverter circuits to the input terminals of the plurality of second flip-flop circuits during a period in which the display data is being transmitted in the display command.

6. The driver circuit according to claim 4, further comprising:

a first inverter circuit that logically inverts data read from the first area and outputs the inverted data to the second area; and a plurality of second inverter circuits that logically invert data read from the second area and output the inverted data to the comparison circuit, wherein the first area includes a plurality of first flip-flop circuits that are connected in series to hold the setting data, and a first switching circuit that sequentially outputs the setting data to the plurality of first flip-flop circuits during a period in which the setting data is being transmitted in the display command and directly sequentially outputs values output from the plurality of first flip-flop circuits to the plurality of first flip-flop circuits during a period in which the display data is being transmitted in the display command, and wherein the second area includes a plurality of second flip-flop circuits that are connected in series to hold the setting data, and a second switching circuit that sequentially outputs the setting data to the plurality of second flip-flop circuits during a period in which the setting data is being transmitted in the display command and sequentially outputs values obtained by logically inverting values output from the plurality of first flip-flop circuits of the first area using the first inverter circuit to the plurality of second flip-flop circuits during a period in which the display data is being transmitted in the display command.

7. An image display system, comprising:

the driver circuit, configured to receive a display command containing setting data and display data and display the display data on a display panel based on the setting data, comprising:

a setting processing part that includes a temporary storage section temporarily storing the setting data contained in the display command until another setting data is transmitted to the temporary storage section and a reflection stage storage section storing the setting data stored in the temporary storage section; and an output circuit that displays the display data contained in the display command on the display panel based on the setting data stored in the reflection stage storage section, wherein the temporary storage section is divided into a first area storing a part of the setting data and a second area storing a part other than the setting data stored in the first area, wherein the second area stores the setting data during a period in which the setting data is being transmitted in the display command and stores data that are same as data stored in the first area during a period in which the display data is being transmitted in the display command, and wherein the setting processing part further includes a comparison circuit that compares the data stored in the first area with data stored in the second area during a period in which the display data is being transmitted in the display command and outputs an abnormality detection signal indicating a possibility of an abnormality in the setting data when the data do not match; and a control circuit that transmits the display command containing the setting data and the display data to the driver circuit and receives the abnormality detection signal based on a result obtained by comparing the data in the temporary storage section from the driver circuit.

* * * * *